United States Patent
Chernoff et al.

(10) Patent No.: US 6,805,397 B1
(45) Date of Patent: Oct. 19, 2004

(54) VEHICLE DOOR

(75) Inventors: Adrian B. Chernoff, Royal Oak, MI (US); Tommy E. White, Rochester Hills, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/427,738

(22) Filed: Apr. 30, 2003

(51) Int. Cl.⁷ .................................................. B60J 5/04
(52) U.S. Cl. .............................. 296/146.2; 296/146.6; 296/187.12; 49/502
(58) Field of Search .................. 296/146.2, 146.6, 296/187.12; 49/501–503

(56) References Cited

U.S. PATENT DOCUMENTS

| | | | |
|---|---|---|---|
| 4,845,894 A | * 7/1989 | Herringshaw et al. | 49/502 |
| 4,969,680 A | 11/1990 | Shimoda | 296/146 |
| 5,056,264 A | 10/1991 | Jewell, II et al. | 49/502 |
| 5,536,060 A | 7/1996 | Rashid et al. | 296/146.6 |
| 5,857,732 A | * 1/1999 | Ritchie | 296/146.5 |
| 5,964,063 A | * 10/1999 | Hisano et al. | 49/502 |
| 5,974,847 A | 11/1999 | Saunders et al. | 72/57 |
| 6,139,088 A | * 10/2000 | Okamoto et al. | 296/146.6 |
| 6,253,588 B1 | 7/2001 | Rashid et al. | 72/57 |
| 6,381,906 B1 | * 5/2002 | Pacella et al. | 49/502 |
| 6,409,250 B1 | * 6/2002 | Schultheiss | 296/146.7 |
| 6,474,721 B2 | * 11/2002 | Nishikawa et al. | 296/146.6 |

* cited by examiner

*Primary Examiner*—Stephen Gordon
(74) *Attorney, Agent, or Firm*—Kathryn A. Marra

(57) ABSTRACT

A vehicle door includes various features that enable a thin door profile not achievable with the prior art. The vehicle door includes an inner panel, an outer panel, and a reinforcement member between the inner panel and the outer panel. Door hardware, including at least a window regulator, is connected to the reinforcement member such that the door hardware is outboard of a window, thereby enabling the inner panel to be positioned in close proximity to the window.

14 Claims, 3 Drawing Sheets

US 6,805,397 B1

VEHICLE DOOR

TECHNICAL FIELD

This invention relates to vehicle doors characterized by a reinforcement at which door hardware is mounted outboard of a window.

BACKGROUND OF THE INVENTION

A prior art vehicle door typically includes an outer panel, an inner panel, and numerous reinforcements such as a beltline reinforcement, a hinge reinforcement, a latch reinforcement, and an impact bar. Door hardware, such as a window regulator, a latch, a window guide, etc., is mounted to the inner panel and is inboard of a glass window when the window is in its open, i.e., retracted, position. The inner panel is typically a structural component, providing a substantial amount of the prior art door's structural integrity and stiffness. An interior trim panel is mounted to the inner panel to provide the door with an aesthetically-pleasing user interface.

SUMMARY OF THE INVENTION

A vehicle door is provided that includes an inner panel, an outer panel operatively connected to the inner panel such that the inner panel and the outer panel form a cavity therebetween, and a reinforcement member at least partially located within the cavity. The vehicle door includes a window selectively movable between an extended and a retracted position. When the window is in the retracted position, it is at least partially located in the cavity between the inner panel and the reinforcement member. Door hardware, such as a window regulator, is preferably operatively connected to the reinforcement member so that it is outboard of the window when the window is in the retracted position. In the context of the present invention, "outboard" corresponds to the direction or orientation that would be outboard with respect to a vehicle if the vehicle door is operatively connected thereto. In other words, the window is between the door hardware and the inner panel.

By mounting door hardware outboard of the window, the inner panel can be positioned in close proximity to the window, resulting in a thinner door compared to the prior art. Furthermore, the inner panel can follow the contour of the window to further reduce the thickness of the door compared to the prior art.

The reinforcement member is preferably a panel that is configured to replace the numerous reinforcements found in a typical prior art door. The use of such a panel provides better dimensional control and fewer tolerance stack-ups compared to the prior art, enabling door designers to design a thinner door than is achievable with the prior art by reducing the design clearances between door components compared to the prior art. Furthermore, the panel may be configured to provide the door with substantially all its structural rigidity and stiffness so that the inner panel need not be a structural member. Thus, the inner panel can be made thinner than prior art inner panels, or an interior trim panel may be employed as an inner panel, thereby eliminating a component found in typical prior art vehicle doors. The vehicle door can therefore reduce door thickness compared to the prior art, and thereby increase vehicle interior space and provide increased exterior styling options The above features and advantages, and other features and advantages, of the present invention are readily apparent from the following detailed description of the best modes for carrying out the invention when taken in connection with the accompanying drawings.

DESCRIPTION OF THE PREFERRED EMBODIMENT

Figure 1:
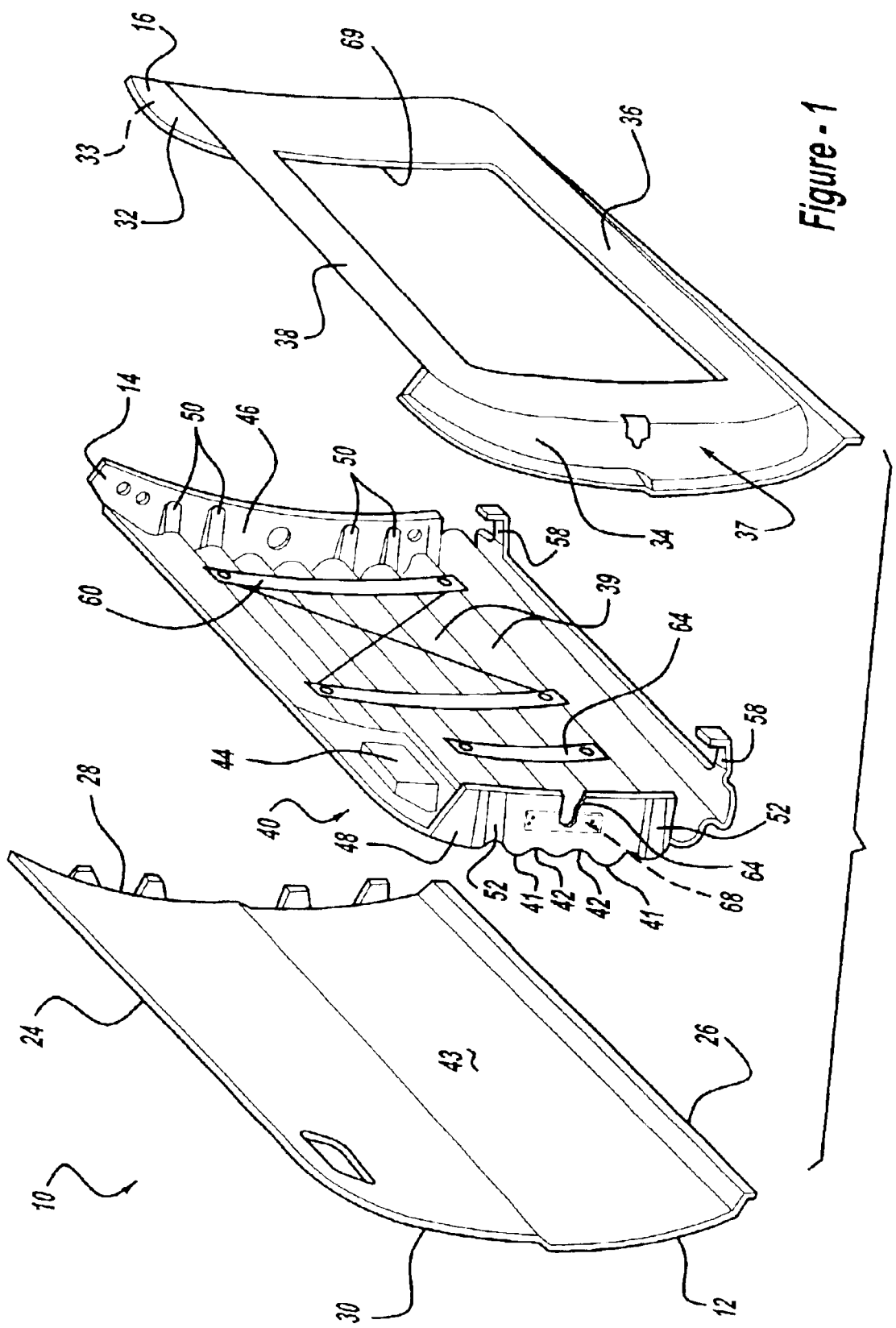
FIG. 1 is an exploded schematic perspective view of a vehicle door according to an embodiment of the invention.

Referring to FIG. 1, an exploded view of a vehicle door assembly 10 is schematically depicted. The door assembly 10 includes an outer panel 12, a reinforcement panel 14, and an inner panel 16. The outer panel 12, formed of a single sheet of material, has a generally smooth exterior, slightly contoured in accordance with the exterior styling of the associated vehicle. The outer panel 12 includes an upper edge 24 forming in part an outer window sill, a bottom edge 26, and front and rear edges 28, 30, each including material for assembly with the inner panel, such as hem flanges.

The inner panel 16 includes vertically and laterally extending front and rear side portions 32, 34 longitudinally connected by a bottom portion 36. The front portion 32 of the inner panel defines a hinge face 33. The rear portion 34 of the inner panel defines a latch face 37. A window sill support member 38 interconnects the upper ends of the front and rear side portions. Outer edges of the front and rear side portions and the bottom portion are adapted for connection with corresponding parts of the outer panel 12. Inner panel 16 is preferably stamped and trimmed from a single sheet of material. Alternatively, within the scope of the claimed invention, the inner panel 16 may be a "trim panel" formed from plastic, fabric, etc, because the reinforcement panel 14 is configured to provide the door assembly 10 with sufficient stiffness and rigidity such that the inner panel need not be substantially load-bearing. The trim panel would form a user interface for the door, and would preferably include a pull handle, an armrest, etc.

The reinforcement panel 14, like the outer panel, is formed from a single sheet. However, its configuration in the illustrated embodiment is considerably more complex such that it is preferably manufactured by superplastic forming, quick plastic forming, or sheet hydroforming. Superplastic forming is described in U.S. Pat. No. 5,974,847, issued Nov. 2, 1999 to Saunders, et al, which is hereby incorporated by reference in its entirety. Quick plastic forming is described in U.S. Pat. No. 6,253,588, issued Jul. 3, 2001 to Rashid, et al, which is hereby incorporated by reference in its entirety. The reinforcement panel, as well as the inner and outer panels, is preferably made from a suitable aluminum alloy material. However, other materials may also be used within the scope of the claimed invention. For example, polymer materials, fiber-polymer composites, metals such as steel, etc., may be employed.

The reinforcement panel 14 is characterized by corrugations 39. The outer face 40 of the reinforcement panel is characterized by a series of longitudinally-oriented ridges 41 which are configured to conform to the shape or contour of the inner face 43 of the outer panel 12. The outer face 40 and the series of ridges 41 extend from near the bottom edge 26 of the outer panel to adjacent to the upper window sill edge 24 and longitudinally along the length of the outer panel over the distance between the front and rear side portions 32, 34 of the inner panel. The outer face of the reinforcement panel is provided with (or interrupted with) a plurality of, in this case seven, longitudinally extending furrows 42. These are, optionally, each about three centimeters wide, have a bell-shaped cross section and extend the full length of the reinforcement panel, except for at least one which stops short of an opening 44 for the door handle.

At the front and rear edges of the reinforcement panel 14 are vertical inwardly extending front and rear side walls 46, 48, respectively. Four laterally extending furrows 50 are provided in the front side wall 46 for stiffening its structure, and two laterally extending furrows 52 are provided in the rear side wall 48 for the same purpose. The front and rear side walls 46, 48 are fixed such as by welding to the corresponding front and rear side portions 32, 34, respectively, of the inner panel to thereby function as a hinge reinforcement and a latch reinforcement, respectively.

The front side wall 46 and front portion 32 of the reinforcement panel and inner panel define openings for the passage of necessary wiring. The front and rear side walls 46, 48 of the reinforcement panel add to the structural stiffness of the front and rear door inner panel side portions 32, 34 and provide a stiff box-like support for the reinforcement panel outer portion. If, as shown, the reinforcement panel is not provided with an optional lower wall, lateral strips 58 may be added for assisting in assembly of the reinforcement panel 14 to the bottom portion of the inner panel.

Door hardware, such as a window regulator 60, window guide 64, and latch 68, is mounted to the reinforcement panel 14 with mechanical fasteners (not shown) at apertures (not shown) defined by the panel 14. Door hardware may be mounted to the reinforcement panel prior to the joining of the inner panel, outer panel, and reinforcement panel and after the inner panel and the outer panel have been painted. Alternatively, and within the scope of the claimed invention, door hardware may be mounted to the reinforcement panel after the inner panel, outer panel, and reinforcement panel have been joined. In such a scenario, the door hardware would be loaded through a hardware access opening 69 in the inner panel and mounted to the reinforcement panel with, for example, pop rivets, self-tapping screws, etc. Those skilled in the art will recognize other door hardware components that may be mounted to the reinforcement panel 14, such as interior and exterior door handles, power lock switches, lock rods, etc.

Figure 2:
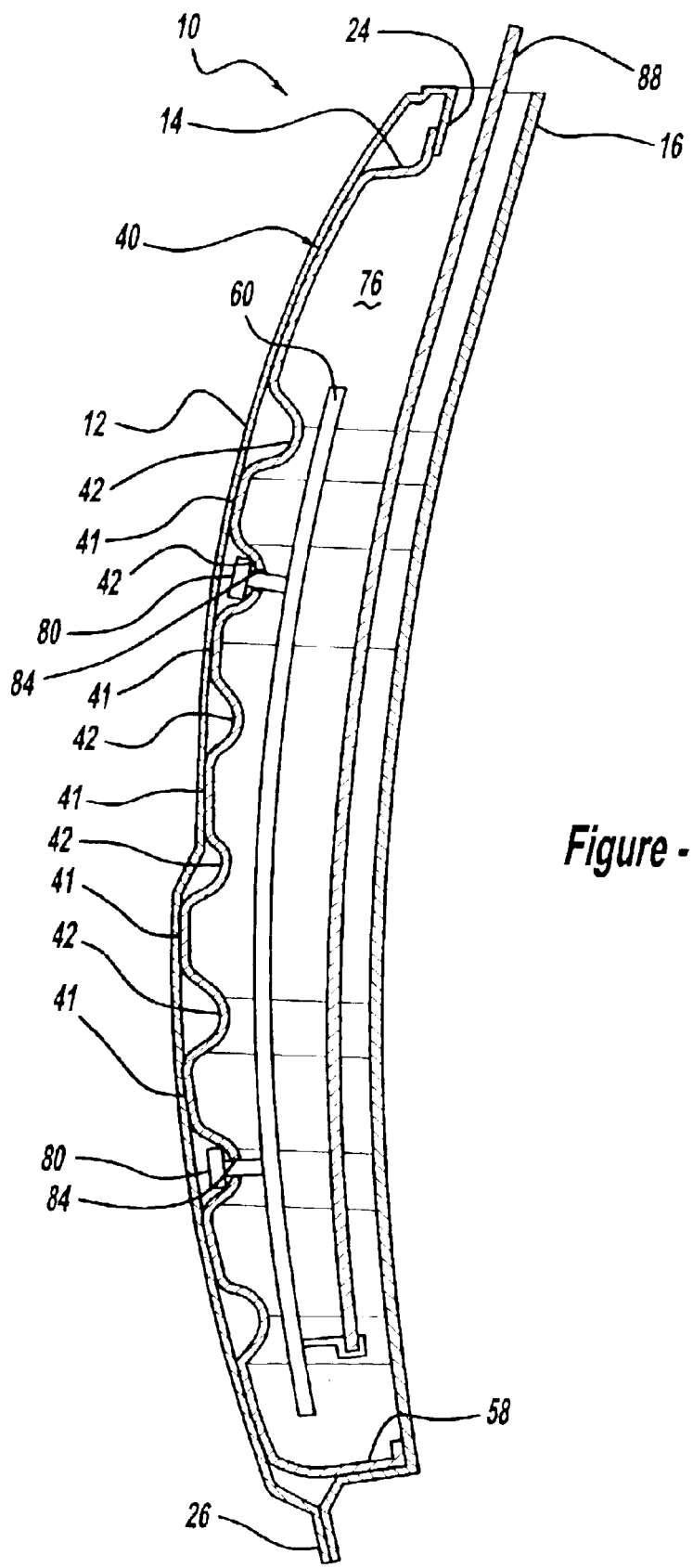
FIG. 2 is a schematic sectional view of the vehicle door of FIG. 1.

Referring to FIG. 2, wherein like reference numbers refer to like components from FIG. 1, a schematic sectional view of the door assembly 10 is depicted. The door assembly includes the inner panel 16 operatively connected to the outer panel 12 such that the inner panel 16 and the outer panel 12 form a cavity 76 therebetween. The reinforcement panel 14 is operatively connected to the inner panel 16 and the outer panel 12 and is substantially entirely located within the cavity 76. Portions of the outer face 40 of the reinforcement panel, i.e., the ridges 41, are positioned in abutting relation to contiguous portions of the outer panel 12 and are preferably fixed thereto, such as by adhesive bonding. The outer panel 12 and furrows 42 form load-bearing box sections, or hollow load-bearing sections, which add to the stiffness of the outer panel-reinforcement panel assembly and improve the strength of the door assembly 10 against intrusion. Mechanical fasteners 80 for retaining the window regulator 60 extend through apertures 84 and are partially located between the reinforcement panel 14 and the outer panel 12 within furrows. The reinforcement panel 14 is connected to the outer panel at the upper edge 24 and the outer window sill to function in part as a belt reinforcement.

A glass window 88 is operatively connected to the window regulator 60. The window regulator 60 is configured to selectively move the window 88 between a retracted position and an extended position in which the window extends higher above the outer window sill than when in the retracted position. The window 88 is substantially entirely located within the cavity 76 between the inner panel 16 and the reinforcement panel 14 when in the retracted position, as depicted in FIG. 2. Similarly, the window 88 is located between the inner panel 16 and the window regulator 60 when in the retracted position so that the inner panel 16 can be in close proximity to the window 88.

Figure 3:
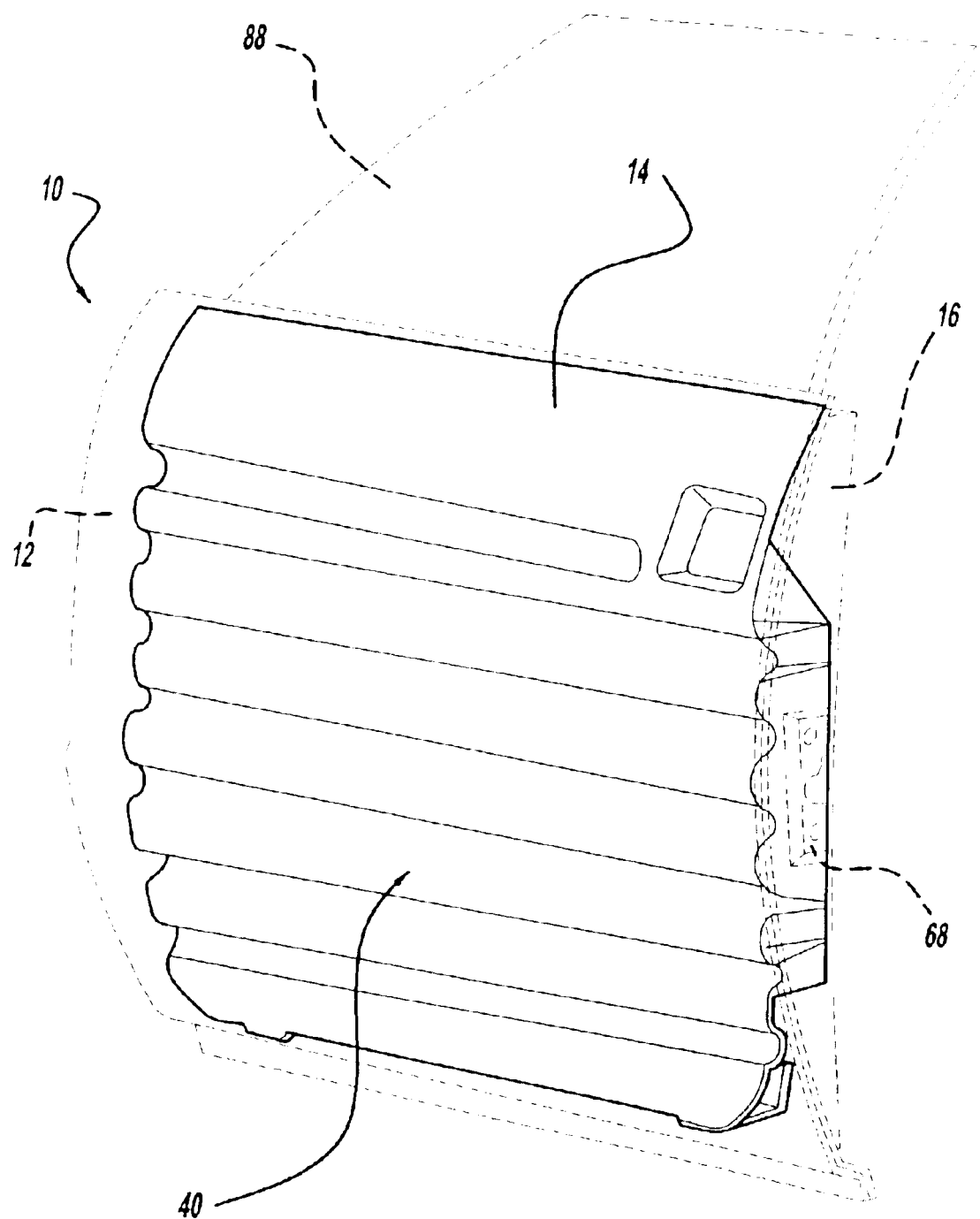
FIG. 3 is a schematic perspective view of the vehicle door of FIGS. 1 and 2.

The window 88 is characterized by a contour, or curvature, which approximates the contour of the inner panel, the reinforcement panel, and the outer panel. Thus, the inner panel 16, the outer panel 12, and the reinforcement panel 14 substantially follow the contour of the window 88, i.e., have a corresponding contour. FIG. 3 is a schematic perspective view of the door assembly 10.

The vehicle door assembly 10 is thinner and more lightweight than most prior art door assemblies, resulting in increased vehicle interior space. The complexity of the reinforcement panel geometry enables more complex door designs with more curvature and angles than is achievable with the prior art. The vehicle door assembly 10 has fewer parts than a typical prior art door, and therefore may reduce costs. The improved dimensional control provided by the reinforcement panel improves door assembly reliability, and therefore may reduce a manufacturer's warranty costs.

While the best mode for carrying out the invention has been described in detail, those familiar with the art to which this invention relates will recognize various alternative designs and embodiments for practicing the invention within the scope of the appended claims.

What is claimed is:

1. A vehicle door comprising:
an inner panel; an outer panel operatively connected to the inner panel such that the inner panel and the outer panel form a cavity therebetween; a reinforcement member operatively connected to the inner panel and the outer panel such that the reinforcement member is at least partially located within the cavity; a window selectively movable between an extended position and a retracted position in which the window is at least partially located within the cavity; and a window regulator operatively connected to the window;
wherein the outer panel is characterized by a lower edge and an outer window sill; wherein a first portion of the inner panel defines a hinge face and a second portion of the inner panel defines a latch face; a wherein the reinforcement member is operatively connected to the outer panel substantially adjacent to the outer window sill to thereby function as a belt reinforcement, operatively connected to the first portion to thereby function as a hinge reinforcement, operatively connected to the second portion to thereby function as a latch face reinforcement, and extends substantially to the lower edge; and
wherein the window regulator is mounted to the reinforcement member.

2. The vehicle door of claim 1, wherein the window is at least partially located between the inner panel and the reinforcement member when the window is in the retracted position.

3. The vehicle door of claim 1, wherein the window is at least partially located between the inner panel and the window regulator when the window is in the retracted position.

4. The vehicle door of claim 1, wherein the reinforcement member is one-piece.

5. The vehicle door of claim 3, wherein the window is characterized by a contour, and wherein the inner panel substantially follows the contour of the window when the window is in the retracted position.

6. The vehicle door of claim 5, wherein the reinforcement member and the outer panel substantially follow the contour of the window when the window is in the retracted position.

7. The vehicle door of claim 1, wherein the reinforcement member is characterized by corrugations.

8. A vehicle door comprising:

an inner panel; an outer panel operatively connected to the inner panel such that the inner panel and the outer panel form a cavity therebetween; a reinforcement member operatively connected to the inner panel and the outer panel such that the reinforcement member is at least partially located in the cavity; a window selectively movable between a retracted position and an extended position; and a window regulator operatively connected to the window;

wherein the window is at least partially located between the inner panel and the window regulator when the window is in the retracted position;

wherein the window is characterized by a contour, and wherein the inner panel substantially follows the contour when the window is in the retracted position; and wherein the outer panel is characterized by a lower edge and an outer window sill; wherein a first portion of the inner panel defines a hinge face and a second portion of the inner panel defines a latch face; and wherein the reinforcement member is a panel operatively connected to the outer panel substantially adjacent to the outer window sill to thereby function as a belt reinforcement, operatively connected to the first portion to thereby function as a hinge reinforcement, operatively connected to the second portion to thereby function as a latch face reinforcement, and extends substantially to the lower edge.

9. The vehicle door of claim 8, wherein the reinforcement member is formed using superplastic forming.

10. The vehicle door of claim 8, wherein the reinforcement member is formed using quick plastic forming.

11. The vehicle door of claim 8, wherein the reinforcement member is formed using sheet hydroforming.

12. The vehicle door of claim 8, wherein the inner panel is an interior trim panel.

13. A vehicle door comprising:

an inner panel; an outer panel operatively connected to the inner panel such that the inner panel and the outer panel form a cavity therebetween; a reinforcement panel having at least one aperture for mounting door hardware, the reinforcement panel being connected to the inner panel and the outer panel such that the reinforcement panel is at least partially located within the cavity; a window selectively movable between an extended position and a retracted position; and a window regulator mounted at said at least one aperture such that the window regulator and reinforcement panel are outboard of the window when the window is in the retracted position;

wherein the outer panel is characterized by a lower edge and an outer window sill; wherein a first portion of the inner panel defines a hinge face and a second portion of the inner panel defines a latch face; wherein the reinforcement panel is operatively connected to the outer panel substantially adjacent to the outer window sill to thereby function as a belt reinforcement, operatively connected to the first portion to thereby function as a hinge reinforcement, operatively connected to the second portion to thereby function as a latch face reinforcement, and extends substantially to the lower edge; and wherein the reinforcement panel is characterized by corrugations.

14. A vehicle door comprising:

an inner panel; an outer panel operatively connected to the inner panel such that the inner panel and the outer panel form a cavity therebetween; a reinforcement member at least partially located in the cavity; a window selectively movable between a retracted position and an extended position; and a window regulator operatively connected to the window;

wherein the window is at least partially located between the inner panel and the window regulator when the window is in the retracted position; and wherein the window is characterized by a curvature, and wherein the inner panel is characterized by a curvature that approximates the curvature of the window.

\* \* \* \* \*